E. C. BALLMAN & E. P. EVERS.
PROJECTING APPARATUS.
APPLICATION FILED AUG. 6, 1914.
1,275,120.
Patented Aug. 6, 1918.
3 SHEETS—SHEET 1.
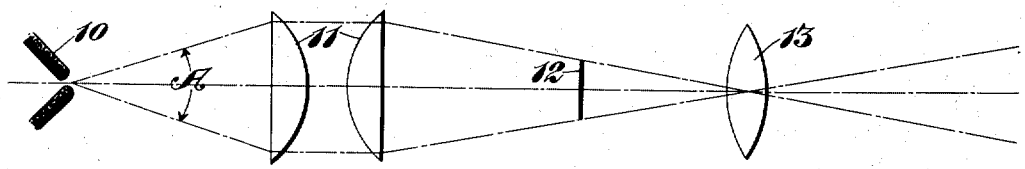
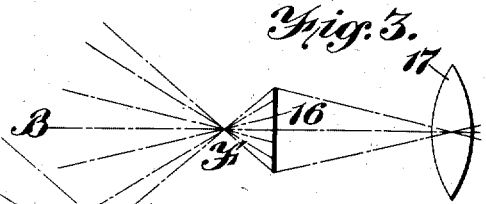
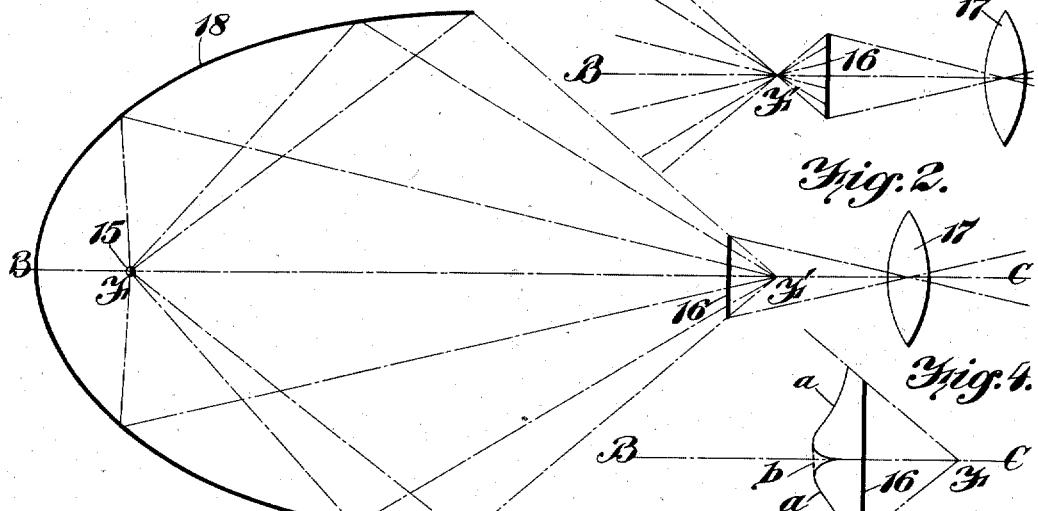
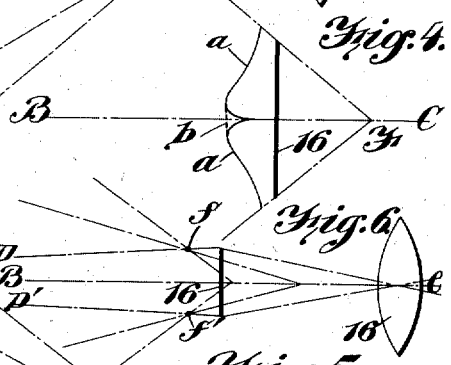
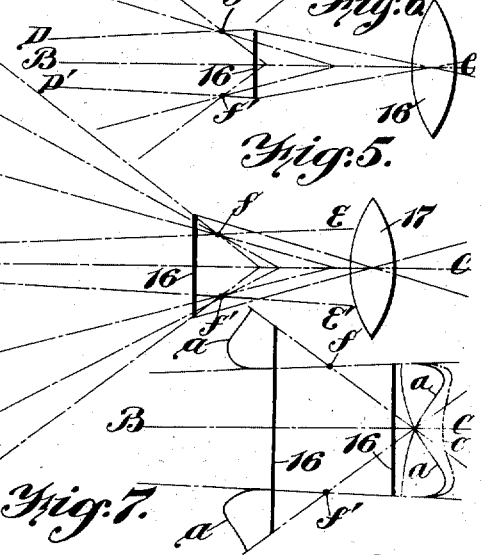
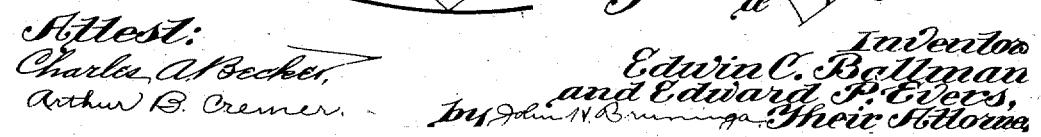

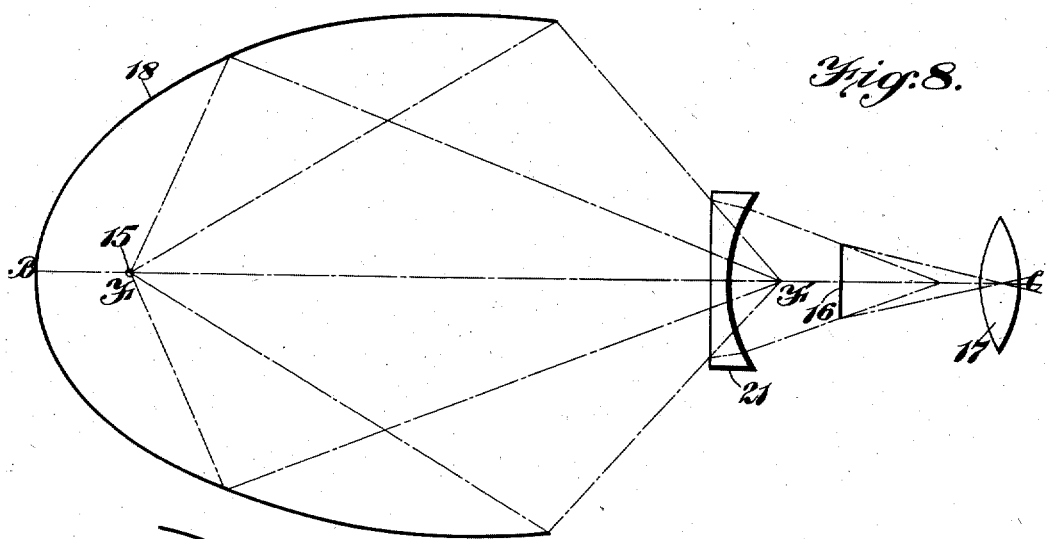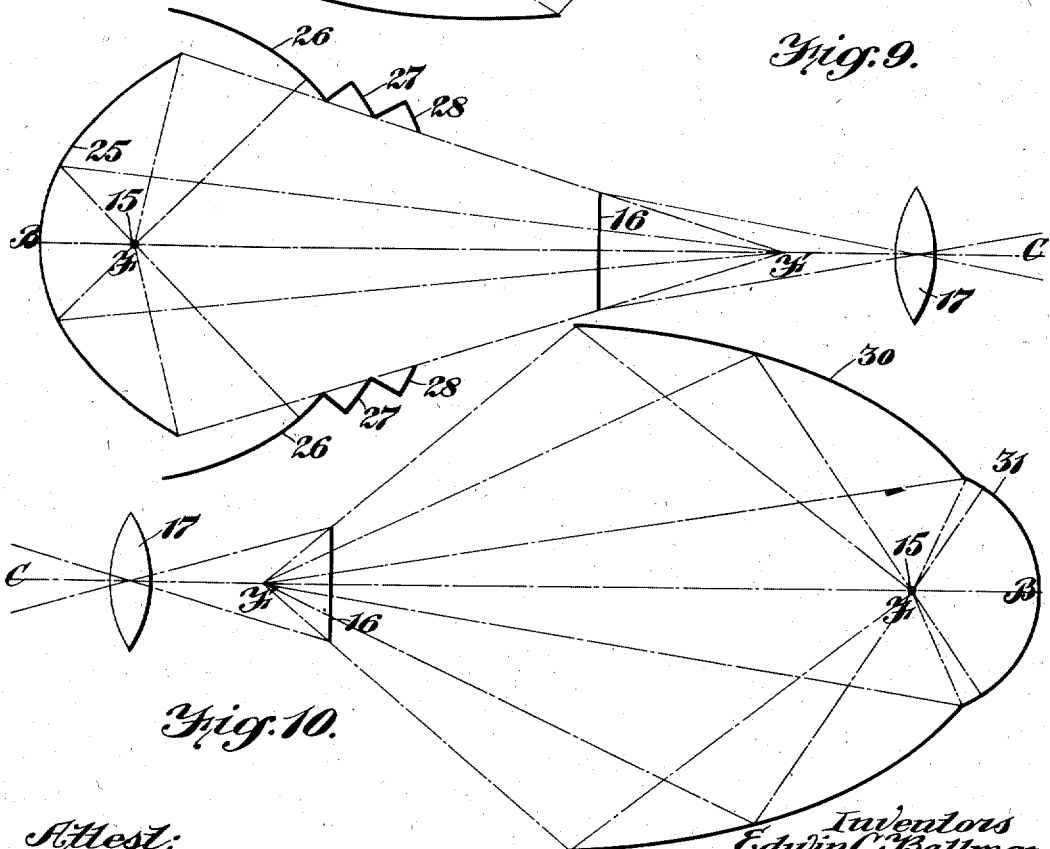

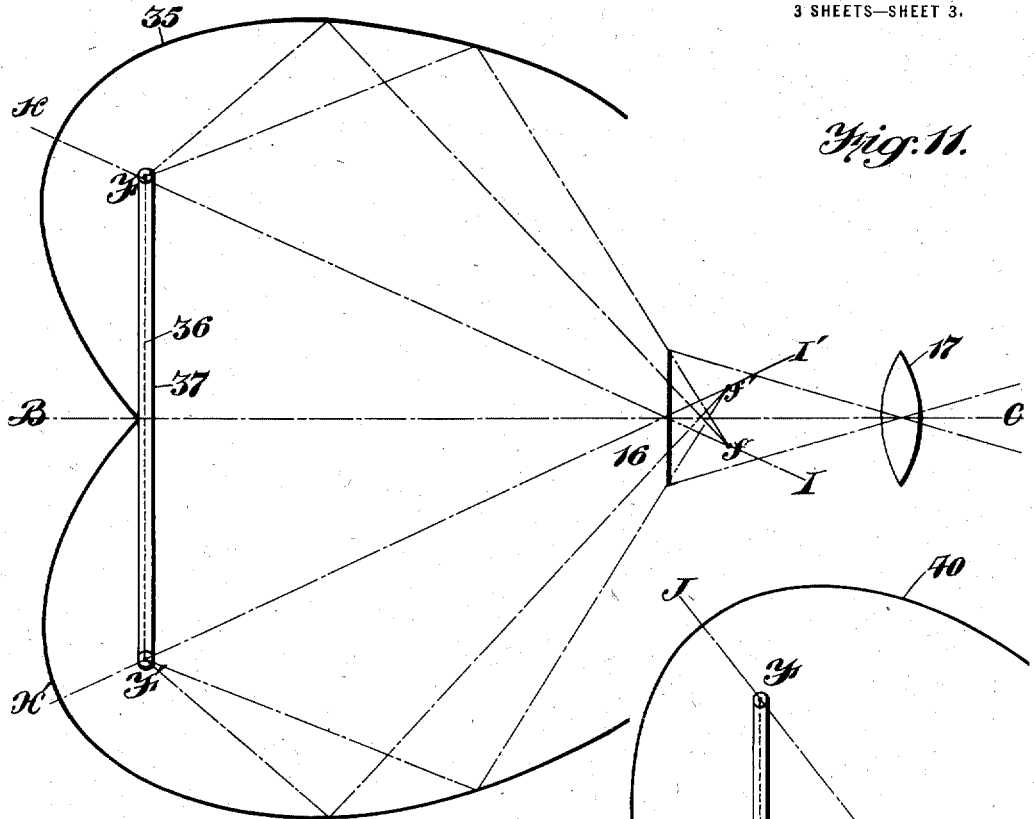

UNITED STATES PATENT OFFICE.

EDWIN C. BALLMAN, OF KIRKWOOD, AND EDWARD P. EVERS, OF ST. LOUIS, MISSOURI.

PROJECTING APPARATUS.

1,275,120.   Specification of Letters Patent.   Patented Aug. 6, 1918.

Application filed August 6, 1914. Serial No. 855,420.

*To all whom it may concern:*

Be it known that we, EDWIN C. BALLMAN, a citizen of the United States, and residing at Kirkwood, in the county of St. Louis and State of Missouri, and EDWARD P. EVERS, a citizen of the United States, and residing at St. Louis, in the State of Missouri, have invented certain new and useful Improvements in Projecting Apparatus, of which the following is a specification.

This invention relates to projecting apparatus.

The ordinary optical lantern used in stereopticon or moving picture machines comprises a source of light, a condenser adapted to concentrate the light on the slide or film, and a projecting lens adapted to project an image of the object on the slide or film on a screen. The source of light is necessarily positioned some distance from the condenser, and the condenser, therefore, receives only the light represented by the solid angle having the source of light as the apex. This solid angle forms only a small part of the total angle, and as a result, therefore, in the ordinary projecting apparatus only about 3½ per cent. of the total light of the source is collected and projected on the screen. In view of the fact that only a small percentage of the total light can be utilized, the intensity of this source must be very great, and it is, therefore, necessary to utilize a high candle power source, such as an arc. The arc must, however, be placed a considerable distance from the condenser to avoid breakage, thereby causing the solid angle to be small; in addition, the high temperature arc is a source of danger, especially in moving picture machines, where an inflammable film is used. Apart from the low effective efficiency of this apparatus and the danger involved in its operation, the arc is necessarily an unsteady source of light, which requires constant regulation, which regulation can only be accomplished by hand and, therefore, requires, for its operation, exceptionally skilled operators, and even then the image will be unsteady.

Some of the objects of this invention therefore are, to provide a projecting apparatus which will obviate the disadvantages of the present construction, which is characterized by high efficiency, constancy of operation, which requires practically no attention, and in which the danger from fire is entirely eliminated.

More specifically stated, the objects of this invention are, to provide a projecting apparatus in which the source of light is combined with an ellipsoidal reflector, which is constructed and arranged with respect to the source of light and the object to be projected to concentrate the major part of the light from said source on said object in such a manner that the object will be illuminated uniformly.

Further objects will appear from the detail description taken in connection with the accompanying drawings, in which:

Figure 1 is a diagram of a projecting apparatus as heretofore constructed,

Fig. 2 is a diagram of a projecting apparatus constructed in accordance with this invention, Fig. 3 is a detail diagrammatical view of the apparatus shown in Fig. 2, showing the object in another position, Fig. 4 is an enlarged detail diagrammatical view of Fig. 2, showing the distribution of the light on the object, Fig. 5 is a diagram of a projecting apparatus, illustrating another embodiment of this invention, and Fig. 6 is a detail, showing the object in another position, Fig. 7 is an enlarged detail diagrammatical view of Fig. 5, showing the distribution of light on the object when this object is in its two positions, Fig. 8 is a diagram of a projecting apparatus, illustrating another embodiment of this invention, Fig. 9 is a diagram of a projecting apparatus, illustrating still another embodiment of this invention, Fig. 10 is a diagram of a projecting apparatus, showing another embodiment of this invention, Fig. 11 is a diagram of a projecting apparatus, showing still another embodiment of this invention, Fig. 12 is a diagram of a projecting apparatus, showing a further embodiment of this invention, and, Fig. 13 is a diagram of a projecting apparatus, showing a still further embodiment of this invention.

Referring to the accompanying drawings, and more particularly, to Fig. 1, 10 designates a source of light, such as an arc, 11 the condenser, 12 the object, and 13 the projecting lens which projects an image of the object on the screen. Upon referring to this figure, it will be seen that the total light received by the condenser 11 is that represented by the solid angle A having its apex at the source of light, and it will be obvious that this solid angle is only a small proportion of the total solid angle representing the total light emitted from said source.

Referring, now, to Fig. 2, B—C represents the axis of the apparatus, 15 the source of light, 16 the object (slide or film), and 17 the projecting lens. A reflector 18 comprising an ellipsoid, formed by revolving an ellipse about B—C as the axis of revolution, is so arranged that one of its foci F is positioned at the source of light 15, while its other focus F' is positioned adjacent the object 16. Now, in an ellipsoid, a ray originating at one focus and incident on the ellipsoidal surface will be reflected back to the other focus. It, therefore, follows that, when a source of light is positioned at one focus of an ellipsoidal reflector, the total light will be reflected back and come to a focus at the other focus. If, therefore, we utilize an ellipsoidal reflector, placed as shown in Fig. 2, and with the reflecting surface extending behind said source and also beyond the source, the major part of the light from said source will be concentrated at the other focus. The proportion of the total light emitted, concentrated at the other focus, increases as the reflecting surface is extended beyond or in front of the source of light, but it will be noted that the major part of the emitted light is thus concentrated when one-half and even one-fourth of a complete ellipse is used.

If the object 16 is placed in the concentrated beam of light, either to the left or to the right of the focus F', as shown in Figs. 2 and 3 respectively, this object will receive the major part of the light emitted by the source. As a matter of fact, taking both the reflected and the direct illumination, the object will receive practically all of the light from the source. The image of the object so illuminated is projected by the projecting lens 17 on the screen.

With this construction, therefore, practically all of the light emitted from the source will be concentrated on the object so that there is no loss, and the efficiency will, therefore, be exceedingly high. In the practical case illustrated in Fig. 2, the total light concentrated on the object will be 80 per cent. and even more, of the total light emitted by the source. It will, therefore, be obvious that, with this construction, the intensity of the source can be very much less than the intensity with the prior construction, as shown in Fig. 1, which utilized only a small proportion of the light emitted. With this construction, therefore, a source, of light having a candle power of 100 will result in an image having the same brightness as the image produced by the prior construction, shown in Fig. 1, when a source, such as an arc, having a candle power of 2000 is used.

Although the apparatus shown in Figs. 2 and 3 has a high efficiency, the intensity of the light on the object illuminated is not uniform, but this intensity decreases from near the center outwardly, thereby forming a bright ring. This is shown in Fig. 4, where the curves $a$ designate the intensity curves, the abscissæ representing intensity of illumination. It will thus be seen that, theoretically, there will be a comparatively dark spot in the center, and then a bright ring which will shade down in intensity toward the outside circumference, and also toward the center. The direct illumination will, of course, equalize and flatten out the curve slightly, especially at the center, as indicated by the dotted line $b$, but even in this case, the illumination will not be uniform. In accordance with this invention, however, the reflector is so constructed, or means are provided for causing the distribution of the light on the object to be uniform. Such a construction is shown in Figs. 5 to 12 inclusive.

Referring, more particularly, to Figs. 5, 6 and 7, B—C represents the axis of revolution of the surface of revolution forming the reflecting surface of the reflector. In this case, however, the surface of revolution is generated by an ellipse section 20 having its axis displaced with respect to the axis of revolution. In this particular embodiment, the axis of the ellipse section is shown at D—E, and this axis is displaced at an angle with respect to the axis B—C, and passes through the focus F. The other focus of the ellipse section 20 is shown at $f$, and this focus is located above the axis of revolution B—C. The revolution of the ellipse section 20 about the axis B—C will, therefore, form a distorted ellipse which, in this case, is expanded, and, since the ellipse axis D—E will generate a cone, the locus of the focus $f$ will be a circle. The lower position of the focus is shown at $f'$, and the axis D—E, when in opposite position, is shown at D'—E'. The formation and structure of the beam of light is shown in Fig. 5. In Fig. 5, the object 16 is shown inside of the foci $f, f'$, while, in Fig. 6, the object is positioned beyond these foci. A contracted ellipsoid may be formed by swinging the ellipse section 20 toward the axis B—C, i. e., by positioning the ellipse section axis D—E so that it falls below the axis B—C, or at D'—E'.

Fig. 7 shows the illumination curves formed with this reflector at the object, when in the two positions shown in Figs. 5 and 6. It will be seen that the parts of the reflector on diametrically opposite sides will form curves which are reversely arranged. At the plane to the left of the foci $f, f'$, the curves are separated so as to leave a dark spot at the center, surrounded by a bright ring. To the right, however, the curves come together and overlap. The resultant curve $c$, shown in dot and dash lines, is, therefore, substantially uniform throughout. In case a contracted ellipse is used, the action is reversed, so that planes to the left of the foci will have uniform illumination. The beam may also be turned by a lens so that the curves of Fig. 5 will overlap to produce a uniform illumination at the left of the foci. The curves shown in Fig. 7 are theoretical curves, considering the source of light as a point. Taking into consideration, however, that the source of light is not a point, even when a filament, and considering also the direct illumination, which is greatest at the center of the object and diminishes toward the outside, it will readily be seen that the resultant illumination curves will be nearly flat. With this construction, therefore, the illumination of the object is substantially uniform throughout. This construction, therefore, in addition to concentrating the major part of the light from the source on the object, causes a uniform illumination of the object so that the projected image will also be uniform.

Fig. 8 shows a construction in which a negative or plano-convex lens 21 is interposed between the reflector 18 and the object 16. This lens is used partly for the purpose of bending the beams outwardly and lengthening them, so as to permit a short focal length reflector to be used, and partly to disperse the light before it strikes the object, so as to render the illumination more uniform by flattening out the intensity curves shown in Fig. 4. The construction of the reflector is, in this construction, shown as the same as that shown in Fig. 2, but this negative lens may also be applied to the constructions shown in Figs. 5 and 6, as well as in the constructions hereafter described.

In Fig. 9, the reflector is a compound construction comprising an ellipsoidal reflector 25 having foci F, F', and a spherical reflector 26 having the focus F as a center. In this construction, the beams passing outside of the reflector 25 will strike the reflector 26 and will be reflected back through the center or focus F, striking the elliptical reflector surface 25 and being reflected back to the other focus F', as shown in Fig. 9. In order to utilize as much light as possible, sectional spherical reflectors 27 and 28 of successively increasing radii extend beyond the reflectors 26 and bound the beam of light. The action of these reflectors 27 and 28 is the same as the reflector 26. In this construction, therefore, the reflector 25 will, by single reflection, and the reflectors 26, 27 and 28 in combination with the reflector 25 will, by double reflection, cause substantially all of the light emitted from the source 15 to be concentrated on the object 16. The reflector 25 may also be a spherical reflector. In this case, the light 15 is placed between the center and the reflector, and preferably close to the reflector, while the reflectors 26, 27 and 28 have their centers at the source of light as before. While such a device will cause concentration of light on the object, it is not as satisfactory as the construction shown in Fig. 8.

Fig. 10 shows a construction in which the reflector has a compound reflecting surface made up of an ellipsoidal part 30 having its foci at F and F', and a spherical part 31 having its center at F. In this construction beams of light impinging directly upon the ellipsoidal surface will be concentrated at the focus F', while beams striking the spherical surface 21, will, by double reflection, be concentrated at F', as in the construction shown in Fig. 9, and as also shown in Fig. 10. This construction possesses the advantage in that it permits more space rearwardly of the focus F to receive the source of light 15, and is of especial advantage in small devices.

In the construction shown in Figs. 2 to 10 inclusive, the source of light is placed at a single focus, and this source of light may be an incandescent lamp of comparatively low candle power, and having a closely looped filament. Figs. 11 and 12 show constructions in which the filament is a ring, and in which the reflector has foci whose locus is a circle, so that the filament of the incandescent light can be placed to conform to this locus.

Referring first to Fig. 11, 35 designates a section of an ellipse having an axis H—I and having foci F—$f$. This ellipse is so positioned that its axis cuts the axis of revolution B—C and so that one focus F will be positioned above the axis, while the other focus $f$ will be positioned below the axis. The surface of revolution will, therefore, be a compound ellipsoid whose foci form circular loci having the axis B—C as centers. The source of light comprises a filament 36, circular in form and placed in a ring shaped bulb 37, and following the locus of the foci F, F', whereby each part of the filament will be positioned at the focus of the ellipse. With this construction, the light from the source will be concentrated on the object 16, as in the other constructions. The intensity curves will be very similar to those shown in Fig. 7, so that the distribution of the light on the object will be substantially uniform throughout. This reflector may also be so constructed that the focus $f$ is above the axis B—C, so that the beams of light will not cross as in Fig. 11.

The object 16 may be placed either inside of the foci $f$, $f'$, or outside of these foci, in the manner shown in Fig. 6. In each case, the major part of the light emitted by the source will be concentrated on the object, and the intensity of illumination will be substantially uniform. The provision of a circular filament following the locus of the foci F, F' permits a high voltage incandescent lamp to be used, thereby adapting this construction for high power apparatus. It will be understood, that, in this construction, as in the other constructions, the source of light is suitably supported in the reflector from the rear, and the electrical connections are suitably made to a source of electric current.

In the construction shown in Fig. 12 the reflecting surface of the reflector is formed by an ellipse 40 having its axis J—K at an obtuse angle with respect to the axis of revolution B—C so as to form a compound ellipsoid having the cross section shown in the figure. The generating ellipse has foci F, F', and these foci, as in the construction shown in Fig. 11, are positioned or have their loci in circles having their centers on the axis B—C. The source of light, which comprises a filament 36, similar to that shown in Fig. 11, is arranged to lie along the locus of the foci F, F'. A conical mirror 41 is positioned inside of the reflector so as to receive the light on its reflecting surface. The angle of this mirror surface with respect to the axis B—C is such that the beams reflected from the mirror surface will come to a focus at $f$, $f'$, having a circular locus. The object 16, therefore, receives the beam of light issuing from the reflector, this beam being concentrated on the object and illuminating the same uniformly, as in the other constructions.

Fig. 13 shows a construction in which the elliptical reflector 45 forms the bulb for the source of light. In this construction the foci are shown at F, F', the source of light (filament) being positioned at one focus F, and the light from this source coming to a focus at F' and being concentrated on the object 16. The bulb, with the exception of the surface bounded by the line 46 representing the issuance of the conical beam of light concentrated on the object, is silvered to form a reflecting surface, but is left unsilvered where the conical beam of light issues. This construction is of advantage in small units, since the bulb there performs the double function of a bulb and a concentrator.

In the construction shown in Fig. 13, the reflector 45 is a simple ellipsoid formed as shown in Fig. 2. This bulb may, however, be a compound ellipsoid of the form shown in Figs. 5 to 12 inclusive. In the first cases, the filament will be closely coiled, while in the latter cases (Figs. 11 and 12) this filament will be a ring.

It will, therefore, be seen that the invention accomplishes its objects. An apparatus is produced in which the major part and substantially all of the light emitted by the source is concentrated on the object whose image is to be projected on the screen. The efficiency of the apparatus will, therefore, be very high, permitting the use of a low candle power source of light. Such a low candle power source not only lessens the danger from fire, but also protects the apparatus. Since this construction permits the use of an incandescent filament adapted to operate from a constant voltage system, the intensity of illumination may be kept constant without attention from the operator. This feature, in connection with the uniform distribution of the light on the object illuminated and to be projected, results in an image which is uniform and constant.

It is obvious that various changes may be made in details of construction without departing from the spirit of this invention, and it is, therefore, to be understood that this invention is not to be limited to the specific construction shown and described.

Having thus described the invention, what is claimed is:

1. A projecting apparatus comprising an ellipsoidal reflector, a source of light positioned at the focus of said reflector so as to cause the latter to concentrate the major part of the light from said source on an object, and means for projecting an image of the object on a screen.

2. A projecting apparatus comprising an ellipsoidal reflector, an object positioned adjacent one of the foci of said reflector, a source of light positioned inside of said reflector at the other focus thereof so as to cause said reflector to concentrate the major part of the light from said source on said object, and means for projecting an image of said object on a screen.

3. A projecting apparatus comprising a source of light, an ellipsoidal reflector inclosing said source of light, said source of light being positioned at one of the foci of said reflector, an object positioned adjacent the other focus of said reflector, whereby said reflector concentrates the light on said object, and means for projecting an image of said object on a screen.

4. A projecting apparatus comprising a source of light, an object, an ellipsoidal reflector constructed and arranged with respect to said source and said object to concentrate the major part of the light from said source on the object, and means for projecting an image of said object on a screen.

5. A projecting apparatus comprising a source of light, an object, an ellipsoidal reflector positioned with one focus at said source and with the other focus adjacent said object, said reflector extending behind said source, and means for projecting an image of said object on a screen.

6. A projecting apparatus comprising a source of light, an object, an ellipsoidal reflector constructed and arranged with respect to said source and said object to receive and concentrate on said object the major part of the rays emitted by said source, and means for projecting an image of said object on a screen.

7. A projecting apparatus comprising a source of light, an object, an ellipsoidal reflector positioned with one focus at said source and with the other focus adjacent said object, and constructed to receive and concentrate on said object the rays impinging rearwardly from said source, and means for projecting an image of said object on a screen.

8. A projecting apparatus comprising a source of light, an object, an ellipsoidal reflector constructed and arranged with respect to said source and said object to concentrate the light from said source uniformly on said object, and means for projecting an image of said object on a screen.

9. A projecting apparatus comprising a source of light, an object, an ellipsoidal reflector constructed and arranged with respect to said source and said object to receive and concentrate uniformly on said object the major part of the rays emitted by said source, and means for projecting an image of said object on a screen.

10. A projecting apparatus comprising a source of light, an object, an ellipsoidal reflector arranged with respect to said source and said object to concentrate the light on said object, and constructed to distribute the light uniformly on said object, and means for projecting an image of said object on a screen.

11. A projecting apparatus comprising a source of light, an object, an ellipsoidal reflector positioned with one focus at said source and with the other focus adjacent said object, means for distributing the light from said source uniformly on said object, and means for projecting an image of said object on a screen.

12. A projecting apparatus comprising a source of light, an object, an ellipsoidal reflector positioned with one focus at said source and with the other focus adjacent said object, said reflector being distorted to control the distribution of the light from said source on said object, and means for projecting an image of said object on a screen.

13. A projecting apparatus comprising a source of light, an object, an ellipsoidal reflector having a plurality of foci at one end and arranged with respect to said source and said object to concentrate the light from said source on said object, and means for projecting an image of said object on a screen.

14. A projecting apparatus comprising a source of light, an object, an ellipsoidal reflector having a plurality of foci at one end, said source being at one focus and said object being adjacent another focus, and means for projecting an image of said object on a screen.

15. A projecting apparatus comprising a source of light, an object, an ellipsoidal reflector having its elliptical axis displaced with respect to its axis of revolution and arranged with respect to said source and said object to concentrate the light from said source on said object, and means for projecting an image of said object on a screen.

16. A projecting apparatus comprising a source of light, an object, an ellipsoidal reflector having its elliptical axis displaced angularly with respect to its axis of revolution and arranged with respect to said source and said object to concentrate the light from said source on said object, and means for projecting an image of said object on a screen.

17. A projecting apparatus comprising a source of light, an object, an ellipsoidal reflector having its elliptical axis displaced with respect to its axis of revolution to form a plurality of foci at one end, and arranged with respect to said source and said object to concentrate the light from said source on said object, and means for projecting an image of said object on a screen.

18. A projecting apparatus comprising a source of light, an object, an ellipsoidal reflector constructed to form a zone of uniform intensity, said reflector being arranged with respect to said source and said object to concentrate the light from said source on said object, and means for projecting an image of said object on a screen.

19. A projecting apparatus comprising a source of light, an object, an ellipsoidal reflector having said source at one focus and said object adjacent the other focus, said reflector being constructed to form a zone of uniform intensity at said object, and means for projecting an image of said object on a screen.

20. The combination with a source of light, of an ellipsoidal reflector having a plurality of foci at one end.

21. The combination with a source of light, of an ellipsoidal reflector having its elliptical axis displaced with respect to its axis of revolution.

22. The combination with a source of light, of an ellipsoidal reflector having its elliptical axis displaced angularly with respect to its axis of revolution.

23. The combination with a source of light, of an ellipsoidal reflector having its elliptical axis displaced with respect to its axis of revolution to form a locus of foci at one end.

24. The combination with a source of light, of an ellipsoidal reflector constructed to form a zone of uniform intensity.

25. The combination with a source of light, of an ellipsoidal reflector constructed to form a zone of uniform intensity adjacent one focus when said source is at the other focus.

26. A projecting apparatus comprising a source of light, an object, a reflector comprising a surface of revolution constructed and arranged with respect to said source and said object to concentrate the major part of the light from said source on the object, and means for projecting an image of said object on a screen.

27. A projecting apparatus comprising a source of light, an object, a reflector comprising a surface of revolution constructed and arranged with respect to said source and said object to receive and concentrate on said object the major part of the rays emitted by said source, and means for projecting an image of said object on a screen.

28. A projecting apparatus comprising a source of light, an object, a reflector comprising a surface of revolution constructed and arranged with respect to said source and said object to receive and concentrate uniformly on said object the major part of the rays emitted by said source, and means for projecting an image of said object on a screen.

29. A projecting apparatus comprising a source of light, an object, a reflector comprising a surface revolution arranged with respect to said source and said object to concentrate the light on said object, and constructed to distribute the light uniformly on said object, and means for projecting an image of said object on a screen.

In testimony whereof we affix our signatures in the presence of these two witnesses.

EDWIN C. BALLMAN.
EDW. P. EVERS.

Witnesses:
J. H. BRUNINGA,
ARTHUR B. CREMER.